United States Patent
Inoue et al.

(10) Patent No.: US 12,389,924 B2
(45) Date of Patent: Aug. 19, 2025

(54) WATER-CONTAINING CHOCOLATE-LIKE CONFECTIONERY AND METHOD FOR PRODUCING WATER-CONTAINING CHOCOLATE-LIKE CONFECTIONERY

(71) Applicant: MEIJI CO., LTD., Tokyo (JP)

(72) Inventors: Kazuya Inoue, Tokyo (JP); Masamichi Tokunaga, Tokyo (JP); Kaoru Higaki, Tokyo (JP); Hiroyuki Utsunomiya, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 1115 days.

(21) Appl. No.: 17/298,175

(22) PCT Filed: Nov. 29, 2019

(86) PCT No.: PCT/JP2019/046897
§ 371 (c)(1),
(2) Date: Jan. 14, 2022

(87) PCT Pub. No.: WO2020/111270
PCT Pub. Date: Jun. 4, 2020

(65) Prior Publication Data
US 2022/0117253 A1 Apr. 21, 2022

(30) Foreign Application Priority Data

Nov. 30, 2018 (JP) .................. 2018-225345
Nov. 30, 2018 (JP) .................. 2018-225346

(51) Int. Cl.
| | | |
|---|---|---|
| A23G 1/36 | (2006.01) | |
| A23G 1/00 | (2006.01) | |
| A23G 1/40 | (2006.01) | |
| A23G 1/46 | (2006.01) | |
| A23G 1/48 | (2006.01) | |

(52) U.S. Cl.
CPC ............ *A23G 1/36* (2013.01); *A23G 1/0026* (2013.01); *A23G 1/40* (2013.01); *A23G 1/46* (2013.01); *A23G 1/48* (2013.01); *A23V 2002/00* (2013.01)

(58) Field of Classification Search
CPC ........ A23G 1/00; A23G 1/04; A23G 2200/06; A23G 2200/08; A23G 1/30; A23G 1/36; A23G 1/0026; A23G 1/40; A23G 1/56
USPC ................ 426/631, 660, 602, 593, 306, 601
See application file for complete search history.

(56) References Cited

U.S. PATENT DOCUMENTS

| | | | | |
|---|---|---|---|---|
| 5,004,623 | A * | 4/1991 | Giddey ............... | A23G 1/325 426/660 |
| 5,120,566 | A | 6/1992 | Baba et al. | |
| 5,965,179 | A | 10/1999 | Ducret et al. | |
| 6,790,466 | B1 * | 9/2004 | Rabault ............... | A23G 3/36 426/660 |
| 7,410,664 | B2 * | 8/2008 | Hanselmann .......... | A23G 1/56 426/660 |

FOREIGN PATENT DOCUMENTS

| | | | |
|---|---|---|---|
| CN | 102187930 | 9/2011 | |
| EP | 1716759 | 11/2006 | |
| JP | 64-43150 | 2/1989 | |
| JP | 3-151831 | 6/1991 | |
| JP | 5-111350 | 5/1993 | |
| JP | 9-135663 | 5/1997 | |
| JP | 10-28530 | 2/1998 | |
| JP | 10-136893 | 5/1998 | |
| JP | 2001-45975 | 2/2001 | |
| JP | 2002-119213 | 4/2002 | |
| JP | 2002-209521 | 7/2002 | |
| JP | 2003-9770 | 1/2003 | |
| JP | 3457411 B2 * | 10/2003 | ............. A23D 7/00 |
| JP | 2005-224139 | 8/2005 | |
| JP | 2012-191918 | 10/2012 | |
| JP | 2012-200246 | 10/2012 | |
| JP | 2013162791 | 8/2013 | |
| JP | 2014-27890 | 2/2014 | |
| WO | 2005/079592 | 9/2005 | |

OTHER PUBLICATIONS

JP 3457411-B2, Sano M. Machine translation, Oct. 20, 2003, pp. 1-6 (Year: 2003).*
International Search Report issued Feb. 18, 2020 in corresponding International (PCT) Application No. PCT/JP2019/046897.
International Preliminary Report on Patentability and Written Opinion issued May 25, 2021 in corresponding International (PCT) Application No. PCT/JP2019/046897.
Extended European Search Report issued Jul. 15, 2022 in corresponding European Patent Application No. 19889387.7.
Office Action issued Jul. 25, 2023 in corresponding Japanese Patent Application No. 2020-557881, with English machine translation.

* cited by examiner

*Primary Examiner* — Hong T Yoo
(74) *Attorney, Agent, or Firm* — Wenderoth, Lind & Ponack, L.L.P.

(57) ABSTRACT

A water-containing chocolate-like confectionery, which comprises an oil-in-water type emulsified mixture, wherein the mixture has a water content of 20% by weight or less, and a water activity of 0.7 or less.

6 Claims, 3 Drawing Sheets

(a)

(b)

(c)

(d)

WATER-CONTAINING CHOCOLATE-LIKE CONFECTIONERY AND METHOD FOR PRODUCING WATER-CONTAINING CHOCOLATE-LIKE CONFECTIONERY

TECHNICAL FIELD

The invention relates to a water-containing chocolate-like confectionery and a method for producing a water-containing chocolate-like confectionery.

BACKGROUND ART

Patent Documents 1 to 8 disclose a technique for producing a water-containing chocolate.

PRIOR ART DOCUMENTS

Patent Documents

Patent Document 1: JP-A-H3-151831
Patent Document 2: JP-A-H10-28530
Patent Document 3: JP-A-2003-9770
Patent Document 4: JP-A-2005-224139
Patent Document 5: JP-A-2013-162791
Patent Document 6: WO 2005179592
Patent Document 7: JP-A-2001-45975
Patent Document 8: JP-A-H10-136893

SUMMARY OF INVENTION

Conventional techniques for a water-containing chocolate-like confectionery and a method for producing the same have room for further improvement in terms of storage stability.

An object of the invention is to provide a water-containing chocolate-like confectionery having excellent storage stability and a production method that can produce a water-containing chocolate-like confectionery having excellent storage stability.

According to the invention, the following water-containing chocolate-like confectionery and the like can be provided.

1. A water-containing chocolate-like confectionery, which comprises an oil-in-water type emulsified mixture, wherein the mixture has a water content of 20% by weight or less, and a water activity of 0.7 or less.

2. The water-containing chocolate-like confectionery according to 1, which comprises an oil-in-water type emulsified mixture,
wherein the mixture comprises a chocolate raw material, water, and one or more sugars selected from the group consisting of a monosaccharide and a disaccharide,
the chocolate raw material comprises a cacao-derived component and fat, and
the mixture has a water content of less than 20% by weight, and a water activity of 0.7 or less.

3. The water-containing chocolate-like confectionery according to 2, wherein the mixture has plasticity at 20° C.

4. The water-containing chocolate-like confectionery according to 2 or 3, wherein the mixture has a total content of microcrystalline cellulose and glycerol of 0.5% by weight or less.

5. The water-containing chocolate-like confectionery according to any one of 2 to 4, wherein the mixture has a content of the one or more sugars of less than 50% by weight.

6. The water-containing chocolate-like confectionery according to 1, wherein the mixture has a water content of 3 to 20% by weight, and a water activity of 0.7 or less.

7. The water-containing chocolate-like confectionery according to 6, wherein the mixture has plasticity at 20° C.

8. The water-containing chocolate-like confectionery according to 6 or 7, wherein the mixture has a total content of microcrystalline cellulose and glycerol of 0.5% by weight or less.

9. The water-containing chocolate-like confectionery according to any one of 6 to 8, wherein the mixture has a content of one or more sugars selected from the group consisting of a monosaccharide and a disaccharide of less than 50% by weight.

10. The water-containing chocolate-like confectionery according to any one of 1 to 9, wherein the water-containing chocolate-like confectionery is a combination of the mixture and an auxiliary raw material.

11. A method for producing a water-containing chocolate-like confectionery, which comprises mixing an oil-based raw material and a water-containing raw material under cooling to obtain an oil-in-water type emulsified mixture,
wherein the mixture has a water content of 20% by weight or less, and a water activity of 0.7 or less.

12. The method for producing a water-containing chocolate-like confectionery according to 11, which comprises a mixing step of kneading a chocolate raw material and a water-containing raw material under cooling to obtain an oil-in-water type emulsified mixture,
wherein the chocolate raw material comprises a cacao-derived component and fat,
at least one of the chocolate raw material and the water-containing raw material contains one or more sugars selected from the group consisting of a monosaccharide and a disaccharide, and
the mixture has a water content of less than 20% by weight, has a water activity of 0.7 or less.

13. The method for producing a water-containing chocolate-like confectionery according to 12, wherein the mixture has plasticity at 20° C.

14. The method for producing a water-containing chocolate-like confectionery according to 12 or 13, wherein the mixture has a total content of microcrystalline cellulose and glycerol of 0.5% by weight or less.

15. The method for producing a water-containing chocolate-like confectionery according to any one of 12 to 14, wherein the mixture has a content of the one or more sugars of less than 50% by weight.

16. The method for producing a water-containing chocolate-like confectionery according to any one of 12 to 15, wherein in the mixing step, the chocolate raw material and the water-containing raw material are kneaded in a state of being cooled to a range of −20° C. to 20° C.

17. The method for producing a water-containing chocolate-like confectionery according to any one of 12 to 18, wherein in the mixing step, the chocolate raw material and the water-containing raw material are kneaded in a state where the fat contained in the chocolate raw material is solidified by cooling.

18. The method for producing a water-containing chocolate-like confectionery according to any one of 12 to 17,
wherein a cooling mixer is used in the mixing step, and
the cooling mixer comprises a cooling kneading section for kneading the chocolate raw material and the water-containing raw material under cooling and a discharge port for discharging the mixture.

19. The method for producing a water-containing chocolate-like confectionery according to 18, wherein the cooling mixer is an extruder having a single or multiple screw, and comprising a cooling unit.

20. The method for producing a water-containing chocolate-like confectionery according to any one of 12 to 19, wherein the water-containing chocolate-like confectionery is produced by the mixture alone, or wherein the water-containing chocolate-like confectionery is produced by combining the mixture with an auxiliary raw material.

21. The method for producing a water-containing chocolate-like confectionery according to 11, which comprises:

a paste preparation step of mixing a powder raw material and a water-based raw material to prepare a paste; and a cooling mixing step of mixing the paste and an oil-based raw material under cooling to obtain an oil-in-water type emulsified mixture, wherein the mixture has a water content of 3 to 20% by weight, and has a water activity of 0.7 or less.

22. The method for producing a water-containing chocolate-like confectionery according to 21, wherein in the paste preparation step, the powder raw material and the water-based raw material are mixed under heating.

23. The method for producing a water-containing chocolate-like confectionery according to 21 or 22, further comprising a forming step of forming the mixture.

24. The method for producing a water-containing chocolate-like confectionery according to any one of 21 to 23, wherein the mixture has plasticity at 20° C.

25. The method for producing a water-containing chocolate-like confectionery according to any one of 21 to 24, wherein the mixture has a total content of microcrystalline cellulose and glycerol of 0.5% by weight or less.

26. The method for producing a water-containing chocolate-like confectionery according to any one of 21 to 25, wherein the mixture has a content of one or more sugars selected from the group consisting of a monosaccharide and a disaccharide of less than 50% by weight.

27. The method for producing a water-containing chocolate-like confectionery according to any one of 21 to 26, wherein in the cooling mixing step, the paste and the oil-based raw material are kneaded in a state where the fat contained in the oil-based raw material is solidified by cooling.

28. The method for producing a water-containing chocolate-like confectionery according to any one of 21 to 27, wherein a cooling mixing unit is used in the cooling mixing step, and the cooling mixing unit comprises a cooling kneading section for kneading the paste and the oil-based raw material under cooling and a discharge port for discharging the mixture.

29. The method for producing a water-containing chocolate-like confectionery according to 28, wherein the cooling mixing unit is an extruder having a single or multiple screw, and comprising a cooling unit.

30. The method for producing a water-containing chocolate-like confectionery according to any one of 21 to 29, wherein the water-containing chocolate-like confectionery is produced by the mixture alone, or wherein the water-containing chocolate-like confectionery is produced by combining the mixture with an auxiliary raw material.

31. A water-containing chocolate-like confectionery, which comprises the mixture obtained by the method for producing a water-containing chocolate-like confectionery according to any one of 11 to 30.

32. A water-containing chocolate-like confectionery, which comprises the mixture obtained by the method for producing a water-containing chocolate-like confectionery according to any one of 12 to 20.

33. A water-containing chocolate-like confectionery, which comprises the mixture obtained by the method for producing a water-containing chocolate-like confectionery according to any one of 21 to 30.

According to the invention, a water-containing chocolate-like confectionery having excellent storage stability and a production method that can produce the water-containing chocolate-like confectionery having excellent storage stability can be provided.

DESCRIPTION OF EMBODIMENTS

Figure 1:
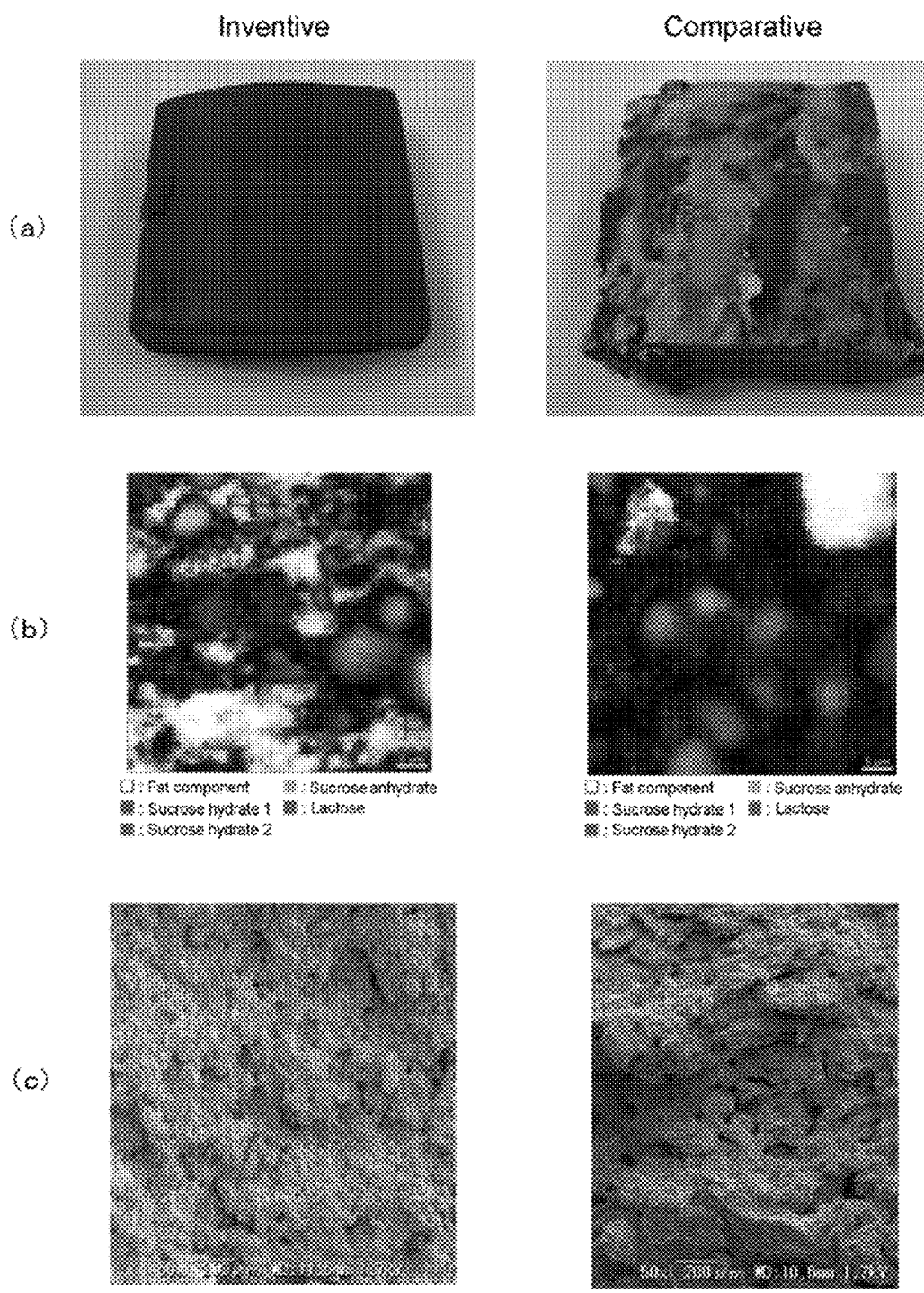
FIG. 1 illustrates a component dispersion state of a mixture produced by the method for producing a water-containing chocolate-like confectionery according to one embodiment of the first aspect of the invention and that of a mixture produced by omitting cooling at the time of mixing the raw materials.

Hereinafter, embodiments of the water-containing chocolate-like confectionery and the method for producing a water-containing chocolate-like confectionery according to the invention will be described.

The water-containing chocolate-like confectionery of the invention comprises an oil-in-water type emulsified mixture, wherein the mixture has a water content of 20% by weight or less, and a water activity of 0.7 or less. Thereby, the mixture is excellent in heat resistance (heat resistant and shape retaining properties and heat resistant non-adhesiveness) at a temperature of, for example, 30° C. or more, and has reduced water activity, and thus the mixture can be stored for a long time at normal temperature. A certain quality of the mixture can be ensured for a long period of about one year at normal temperature, for example, without carrying out sterilization using alcohol or the like. In addition, the exudation of oil and water from the mixture during storage can be preferably suppressed.

The method for producing a water-containing chocolate-like confectionery according to the invention comprises mixing an oil-based raw material and a water-containing raw material under cooling to obtain an oil-in-water type emulsified mixture, wherein the mixture has a water content of 20% by weight or less, and a water activity of 0.7 or less. Thereby, the fat and water contained in the mixture used for the water-containing chocolate-like confectionery can be uniformly dispersed.

As used herein, the "water-containing chocolate-like confectionery" is not limited to the case of "chocolates" in the Fair Competition Rules stipulated by the Federation of Fair Trade Conferences of Japan, and may be any confectionery containing the mixture described above.

The water content of the mixture contained in the water-containing chocolate-like confectionery can be preferably 18% by weight or less, 15% by weight or less, 13% by weight or less, 11% by weight or less, 10% by weight or less, 9% by weight or less, and further 8% by weight or less. In addition, the lower limit of the water content is not particularly limited, and can be, for example, 3% by weight or more, 4% by weight or more, and further 5% by weight or more.

From the viewpoint of improving storage stability, the water activity of the mixture is preferably 0.69 or less, 0.68 or less, 0.67 or less, 0.66 or less, 0.65 or less, 0.64 or less, 0.63 or less, 0.62 or less, 0.61 or less, 0.60 or less, and further 0.55 or less. The lower limit of water activity is not particularly limited and can be, for example, 0.40 or more. In a certain embodiment, sufficient storage stability can be obtained in the water activity range of 0.60 or more and 0.70 or less.

The mixture preferably has plasticity at 20° C.

"Plasticity" as used herein means that in an environment of 20° C., deformation by pressing is possible and the shape can be maintained after the pressing is released. It should be noted that the shape after the pressing is released may be maintainable to the extent that no change is observed with the naked eye. The mixture having such plasticity can be formed into a free shape using a finger. A mixture having such plasticity has the effect of being excellent, for example, in formability or the like.

The mixture preferably has plasticity after stored at 20° C., 23° C., 25° C., and further 28° C. for at least 10 hours, at least 24 hours, at least 1 week, at least 1 month, and further at least 3 months immediately after production.

The mixture preferable has plasticity after stored at 20° C., 23° C., 25° C., and further 28° C. for 10 hours or more, 24 hours or more, 1 week or more, 1 month or more, and further 3 months or more.

According to the invention, the water activity can be reduced by uniformly dispersing the components in the mixture by kneading (mixing) under cooling. Because of this, it is possible to reduce the amount of an additive added for the purpose of reducing the water activity in general, or to omit the addition. Such an additive often reduces the original flavor quality of chocolate, and thus the original flavor quality of chocolate can be improved by reducing or omitting the additive. Examples of such an additive include a sugar (particularly a sugar alcohol), microcrystalline cellulose, and a gelling agent. The addition of such an additive will be described in detail below.

The mixture preferably has a content of a sugar selected from the group consisting of a monosaccharide and a disaccharide of less than 50% by weight. When the content of the sugar is less than 50% by weight, less than 40% by weight, less than 30% by weight, less than 25% by weight, and further less than 20% by weight, the effect of further improving the original flavor quality of chocolate can be obtained. In addition, when the content of the sugar selected from the group consisting of a monosaccharide, a disaccharide, and a sugar alcohol is less than 50% by weight, less than 40% by weight, less than 30% by weight, less than 25% by weight, and further less then 20% by weight, the effect of further improving the original flavor quality of chocolate can be obtained. Further, when the mixture has a sugar alcohol content of less than 50% by weight, 40% by weight or less, 30% by weight or less, less than 25% by weight, 20% by weight or less, 10% by weight or less, 5% by weight or less, 3% by weight or less, and 1% by weight or less, and further, contains no sugar alcohol, the original flavor quality of chocolate is further improved. Examples of the sugar alcohol include sorbitol, xylitol, erythritol, and glycerol. In addition, in one embodiment, the mixture preferably has a total content of microcrystalline cellulose and glycerol of 0.5% by weight or less, and is most preferably free of microcrystalline cellulose and glycerol. Thereby, the original flavor quality of chocolate is further improved. In addition, when the content of glycerol in the mixture is low, an excessive increase in viscosity is suppressed, and the viscosity suitable for mixing and transport is easily retained at the time of production.

The mixture preferably has a content of the gelling agent of 10% by weight or less, 5% by weight or less, or 1% by weight or less, and more preferably contains no gelling agent. Examples of the gelling agent include carrageenan, gellan gum, gelatin, xanthan gum, pectin, agar, locust bean gum, and guar gum.

An emulsifier can be blended into the mixture. The content of the emulsifier in the mixture can be, for example, 10% by weight or less, 5% by weight or less, and 1% by weight or less. In addition, an emulsifier may not be blended into the mixture. According to the production method according to the present embodiment, even when no emulsifier is blended, the fat and water are not separated during the production step, and a mixture in which the fat and water are uniformly dispersed can be obtained.

The content of the fat in the mixture is not particularly limited as long as it can form an oil-in-water type emulsified state, and for example, is preferably 3% by weight or more and 97% by weight or less, and further preferably 20% by weight or more and 50% by weight or less. Of the total amount of the fat in the mixture, 30% by weight or more, 50% by weight or more, 70% by weight or more, 80% by weight or more, 90% by weight or more, and further 95% by weight or more are preferably derived from the chocolate raw material. The content of the fat is a value measured by "Attachment Analysis methods of nutritional components, etc." 2. Lipid (4) Acid hydrolysis method, "Attachment: Nutrition Labeling" (http://www.caa.go.jp/policies/poflcy/food_labeling/food_labeling_actpdf/foods_index_18_180119_0003.pdf) on the Consumer Affairs Agency website of Japan.

The water-containing chocolate-like confectionery may be composed of the mixture alone, or may be composed of a combination of the mixture and any auxiliary raw material. The auxiliary raw material is not particularly limited, and examples thereof include a covering material that covers at least a part of the surface of the mixture. The covering material can have, for example, a powdery form or a layered form. In addition, the auxillary raw material may be an inclusion included inside the mixture. The auxiliary raw material is not particularly limited as long as it is a food product, and may be, for example, chocolate, white chocolate, cream, sauce, a nut (almond), a fruit (rum raisin), a baked good (biscuit), or a cheese.

A water-containing chocolate-like confectionery that is a combination of a mixture and an auxiliary raw material may be referred to as a "composite confectionery."

Hereinafter, a first aspect and a second aspect of the invention will be described. The invention includes the first aspect and the second aspect, and the above description of the invention is applied to the first aspect and the second aspect. The descriptions for each of the first aspect and the second aspect are applied to each other as appropriate. The "chocolate raw material" in the first aspect corresponds to the "oil-based raw material" described above. In addition, the "paste" in the second aspect corresponds to the "water-containing raw material" described above.

(First Aspect)

The first aspect of the invention relates to a method for producing a water-containing chocolate-like confectionery that can produce a water-containing chocolate-like confectionery having excellent flavor quality, and a water-containing chocolate-like confectionery having excellent flavor quality.

The problem to be solved by the first aspect of the invention will be described.

The water-containing chocolate is produced by adding a water-containing edible product to a chocolate base and mixing the same. Usually, when the water content of the resulting mixture is in the range of 3 to 20% by weight, thickening and separation of components occur because of low emulsion stability, and it is difficult to produce a stable water-containing chocolate.

Patent Document 1 discloses a technique for producing a water-containing chocolate having a water content of 20% by weight or less by blending an emulsifier having a low HLB value into chocolate. However, this water-containing chocolate is in a water-in-oil type emulsified state, and thus the flavor quality of the water-containing chocolate emulsified into an oil-in-water type cannot be obtained.

Patent Document 2 discloses a technique for producing a water-containing chocolate having a water content of 3 to 20% by weight. However, this technique requires the blending of a gelling agent, microcrystalline cellulose, and a polyhydric alcohol such as glycerol, and the resulting water-containing chocolate has a flavor quality similar to that of standard chocolate, and thus can be considered to be a water-in-oil type, and the flavor quality of a water-containing chocolate emulsified into an oil-in-water type cannot be obtained.

Patent Document 3 discloses a technique for blending a cellulose complex into a water-containing chocolate. In this technique, the cellulose complex is mixed in advance into fresh cream mixed into chocolate, and thus it is presumed that the resulting water-containing chocolate is emulsified into a water-in-oil type, and the flavor quality of a water-containing chocolate emulsified into an oil-in-water type cannot be obtained.

Patent Document 4 discloses that the water content is 2 to 40% by weight, particularly 4 to 15% by weight, in order to emulsify the water-containing chocolate into a water-in-oil type. Patent Document 4 also has a description of a water-containing chocolate emulsified into an oil-in-water type, but no specific method for producing the same is clear.

On the other hand, Patent Document 5 discloses a technique for producing a water-containing chocolate emulsified into an oil-in-water type. In this technique, the water activity (hereinafter, sometimes referred to as "Aw") is reduced by containing 55 to 70% by weight of a carbohydrate that is a di- and/or lower saccharide having a content of a linear polyhydric alcohol (that is, sugar alcohol) of 10 to 25% by weight in a water-containing chocolate. The method for reducing the water activity by relying on the addition of a large amount of a sugar alcohol as described above cannot obtain the original flavor quality of chocolate.

Therefore, the prior art has room for further improvement in terms of improving the flavor quality of the water-containing chocolate-like confectionery.

Then, an object of the first aspect of the invention is to provide a method for producing a water-containing chocolate-like confectionery that can produce a water-containing chocolate-like confectionery having excellent flavor quality, and a water-containing chocolate-like confectionery having excellent flavor quality.

Hereinafter, embodiments of the method for producing a water-containing chocolate-like confectionery and the water-containing chocolate-like confectionery according to the first aspect of the invention will be described.

[Method for Producing Water-Containing Chocolate-Like Confectionery]

The method for producing a water-containing chocolate-like confectionery according to one embodiment of the first aspect of the invention comprises a mixing step of kneading a chocolate raw material and a water-containing raw material under cooling to obtain an oil-in-water type emulsified mixture, wherein the chocolate raw material comprises a cacao-derived component and fat, at least one of the chocolate raw material and the water-containing raw material contains one or more sugars selected from the group consisting of a monosaccharide and a disaccharide, and the mixture has a water content of less than 20% by weight, has a water activity of 0.7 or less. Thereby, the effect of being able to produce a water-containing chocolate-like confectionery having excellent flavor quality can be obtained.

In the present aspect, the "water-containing chocolate-like confectionery" is not limited to the case of "chocolates" in the Fair Competition Rules stipulated by the Federation of Fair Trade Conferences of Japan, and may be any confectionery containing the mixture described above.

In the method for producing a water-containing chocolate-like confectionery according to the present embodiment, the chocolate raw material and the water-containing raw material can be mixed in a state where the fluidity of the fat in the chocolate raw material is reduced by cooling, preferably in a state where the fat is solidified by cooling. Thereby, the components in both raw materials can be uniformly dispersed while preventing the separation of the fat in the chocolate raw material. This will be described with reference to FIG. 1.

FIG. 1 illustrates a component dispersion state of a mixture (first aspect of the invention) produced by the method for producing a water-containing chocolate-like confectionery according to one embodiment of the first aspect of the invention and that of a mixture (comparative) produced by omitting cooling at the time of mixing the raw materials. In FIG. 1. (a) is photographs of the external appearance of the mixtures, (b) is Raman spectroscopic microscopic images (magnification: 60 times) of the inside of the mixtures, and (c) is scanning electron microscopic (SEM) images (magnification: 50 times) of the inside of the mixtures. In particular, from the Raman spectroscopic microscopic images of (b) (the fat is colored white), the fat is localized in the comparative, whereas in the first aspect of the invention it can be confirmed that refined fat crystals are uniformly dispersed within the sugar network. "Sucrose-hydrate 1" and "sucrose-hydrate 2" in FIG. 1 (b) are referred to as "sucrose-monohydrate" and "sucrose-dihydrate", respectively.

As a result, according to the method for producing a water-containing chocolate-like confectionery according to one embodiment of the first aspect of the invention, a water-containing chocolate-like confectionery having a water content of less than 15% by weight, having a water activity of 0.7 or less, and emulsified into an oil-in-water type can be preferably produced. In particular, such a mixture can be obtained without relying on the addition of a large amount of a sugar alcohol, which tends to impair the original flavor quality of chocolate. The water-containing chocolate-like confectionery containing such a mixture can allow perception in the mouth of many of the preferred aroma components that give a good flavor of chocolate, in smaller amounts. In addition, such a water-containing chocolate-like confectionery also has an excellent taste because the elution of components derived from water-containing raw materials such as a sugar and an acid is accelerated in the mouth.

Such a mixture has a lower water content than a conventional general oil-in-water type water-containing chocolate and has achieved the fine uniform dispersion described above, and thus has different flavor development characteristics from those of the conventional oil-in-water type water-containing chocolate, has a strong sweetness and aroma, and a weak bitterness, and can obtain a strong lingering finish by staying in the mouth for a long time.

According to the method for producing a water-containing chocolate-like confectionery according to one embodiment of the first aspect of the invention, the mixture described above can be easily obtained without providing a complicated step or adding a special additive.

Examples of the cacao-derived component contained in the chocolate raw material include a cacao bean, a cacao nib, cacao mass, cocoa butter, cocoa powder, and cocoa cake. The cacao nib is an albumen portion obtained by crushing a cocoa bean and removing the bean shell and the embryo. The cacao mass is obtained by grinding a cacao nib. By processing cacao mass according to a conventional method, cocoa butter, cocoa powder, and cocoa cake can be obtained.

The chocolate raw material can appropriately contain another component other than the cacao-derived component. The another component is not particularly limited, and examples thereof include a sugar, a dairy raw material, an emulsifier, and a flavoring. Examples of the sugar include a monosaccharide, a disaccharide, oligosaccharides from a trisaccharide to a decasaccharide. Examples of the monosaccharide include glucose and fructose. Examples of the disaccharide include sucrose and lactose. Examples of the dairy raw material include whole milk powder, skim milk powder, and a milk protein.

One of the components exemplified above as a chocolate raw material may be used alone or a plurality of types may be used in combination, but one or more components containing fat are selected.

The chocolate raw material can be subjected to a pretreatment before the mixing step of kneading the chocolate raw material and the water-containing raw material. Examples of the pretreatment include mixing, milling (refining), and conching of the components composing the chocolate raw material. Any method known in the art can be used for these pretreatments.

The chocolate raw material can have the form of a chocolate base. As used in this aspect, the "chocolate base" refers to a liquid chocolate obtained through mixing, milling, and conching of the components composing the chocolate raw material. Specific examples of the chocolate base include milk chocolate base, white chocolate base, and high cacao chocolate base. The milk chocolate base contains, for example, cacao mass, cocoa butter, whole milk powder, an emulsifier, a flavoring, and sucrose. The white chocolate base contains, for example, cocoa butter, whole milk powder, an emulsifier, a flavoring, and sucrose. The high cacao chocolate base contains, for example, cacao mass, cocoa butter, cocoa powder, an emulsifier, a flavoring, and sucrose.

In the chocolate raw material, fat is contained as at least one of a cacao-derived component and another component. One or more fats that are solidified at a temperature of 20° C. or less are preferably contained. The chocolate raw material preferably contains fat which is a cacao-derived component, for example, cocoa butter, 90% by weight or more of cocoa butter is usually composed of three fatty acids consisting of oleic acid, stearic acid, and palmitic acid, and is solidified at a temperature of 25° C. or less, and particularly stably solidified at a temperature of 20° C. or less.

The water-containing raw material is not particularly limited as long as it is a raw material containing water, and examples thereof include an egg, a fruit juice, a sugar-containing liquid, a cheese, a juice, and fresh cream. Examples of the egg include whole egg, egg yolk, and egg white. Examples of the fruit juice include strawberry juice. The sugar-containing liquid is, for example, an aqueous solution containing a sugar exemplified as a chocolate raw material, and examples thereof include a sugar alcohol-containing liquid such as sorbitol, various liquid sugars, and starch syrup. Examples of the cheese include a natural cheese, a processed cheese, and a cheese food. The water-containing raw material may be in the form of a liquid or a paste, and is preferably in the form of a paste. In one embodiment, the water-containing raw material may be composed only of water.

At least one of the chocolate raw material and the water-containing raw material contains one or more sugars selected from the group consisting of a monosaccharide and a disaccharide.

In the mixing step, the chocolate raw material and the water-containing raw material are kneaded under cooling to obtain a mixture.

By the cooling, the fluidity of the fat in the chocolate raw material is reduced and the fat is preferably solidified. By kneading in this state, separation of the fat is prevented, and the components of the chocolate raw material and the components of the water-containing raw material are uniformly dispersed. Thereby, the water derived from the water-containing raw material is uniformly dispersed in the mixture, and the water activity is reduced.

In the mixing step, the chocolate raw material and the water-containing raw material are preferably kneaded in a state of being cooled in the range of −20° C. to 20° C. Thereby, the fat in the chocolate raw material is preferably solidified, the uniform dispersion is further promoted, and as a result, the water activity is further reduced.

Kneading in a state in which the fat in the chocolate raw material is solidified by cooling is preferable. In the present embodiment, the "state in which the fat in the chocolate raw material is solidified" means a state in which 65% by weight or more of all the fat in the chocolate raw material are solidified. For the chocolate raw material, if the solid fat content (SFC) measured at a certain temperature is 65% by weight or more of all the fat in the chocolate raw material, kneading can be carried out in a state in which the fat in the chocolate raw material is solidified at the temperature. Here, the solid fat content is a value measured by a nuclear magnetic resonance (NMR) method.

In the mixing step, a cooling mixer can be used. The cooling mixer preferably includes a cooling kneading section for kneading the chocolate raw material and the water-containing raw material under cooling, and a discharge port for discharging the mixture. The mixture can be given any shape according to the opening shape of the die (base) provided at the discharge port. The mixture extruded by the cooling mixer may be further formed. For example, the mixture may be extruded into a sheet and then the sheet-shaped mixture may be cut to give the final shape. The final shape is not particularly limited, and may be any shape such as a rectangular parallelepiped, a cube, a cylinder, a prism, or a sphere.

In a preferred embodiment, the cooling mixer described above can be, for example, an extruder having a single or multiple screw. Among these, an extruder having a twin screw (hereinafter, also referred to as a "twin-screw extruder") is preferable.

The extruder can include a cooling unit for cooling the chocolate raw material and the water-containing raw material to be kneaded. The cooling unit is not particularly limited, and for example, a jacket structure in which a flow path through which the refrigerant flows is formed can be used. The cooling unit may be any one that can cool the raw material passing through the cooling kneading section. The cooling unit may be provided, for example, on the housing side surrounding the screw of the extruder, or on the screw side.

In a preferred embodiment, the chocolate raw material and the water-containing raw material fed into the inlet of the extruder pass through the cooling kneading section in the process of being conveyed toward the discharge port by the screw. In the cooling kneading section, the chocolate raw material and the water-containing raw material are kneaded by the screw in a state of being cooled preferably in the range of −20° C. to 20° C.

By using the extruder, it is possible to continuously carry out from kneading the chocolate raw material and the water-containing raw material under cooling to discharging the mixture. Because of this, the mixture can be discharged while a state in which the components derived from these raw materials are uniformly dispersed is kept good.

The extruder carries out kneading by causing shear stress to act on the chocolate raw material and the water-containing raw material by a rotating screw. In addition, when the screw presses these raw materials toward the discharge port, pressure acts on these raw materials. By the action of such shear stress and pressure, the components of the chocolate raw material and the components of the water-containing raw material are further uniformly dispersed.

Because of the temperature rise caused by such shear stress and pressure, the temperature of the mixture discharged from the discharge port can be higher than the temperature in the cooling kneading section. The temperature of the mixture discharged from the discharge port is preferably, for example, 35° C. or less, 30° C. or less, 28° C. or less, 26° C. or less, and further 25° C. or less.

The extruder may be provided with one or more inlets. The chocolate raw material and the water-containing raw material may be commonly fed into one inlet, or may be fed into a plurality of inlets for the raw materials, respectively. The temperatures of the chocolate raw material and the water-containing raw material fed into the inlet are not particularly limited, and may be, for example, room temperature.

In the above description, the extruder has been mainly described as the cooling mixer, but the cooling mixer is not limited to this extruder. The cooling mixer may be any one including a cooling unit and a mixing unit for mixing the raw materials cooled by the cooling unit, and may be, for example, a mixer including a cooling jacket.

In the present embodiment, the mixture obtained by the mixing step described above has a water content of less than 20% by weight, has a water activity of 0.7 or less, and is emulsified into an oil-in-water type.

In a certain embodiment, the water content of the chocolate raw material is, for example, preferably 0% by weight or more and 10% by weight or less, and further preferably 0% by weight or more and 5% by weight or less. In addition, the content of the fat of the chocolate raw material is preferably 5% by weight or more and 100% by weight or less, and further preferably 10% by weight or more and 100% by weight or less. On the other hand, the water content of the water-containing raw material is, for example, preferably 5% by weight or more and 100% by weight or less, and further preferably 10% by weight or more and 100% by weight or less. In addition, the content of the fat of the water-containing raw material is preferably 0% by weight or more and 95% by weight or less, and more preferably 0% by weight or more and 80% by weight or less.

Figure 2:
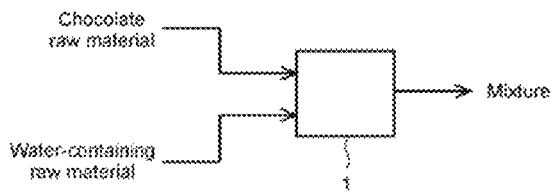
FIG. 2 is block diagrams illustrating embodiments of mixing a chocolate raw material and a water-containing raw material.
Figure 2:
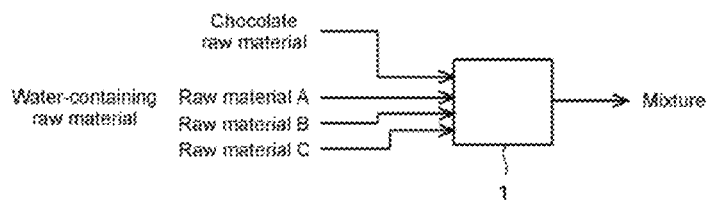
Figure 2:
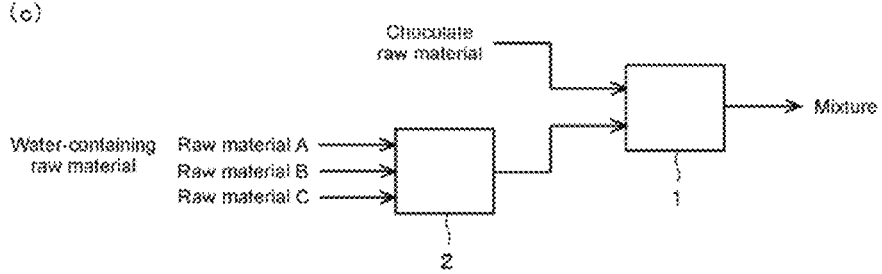
Figure 2:
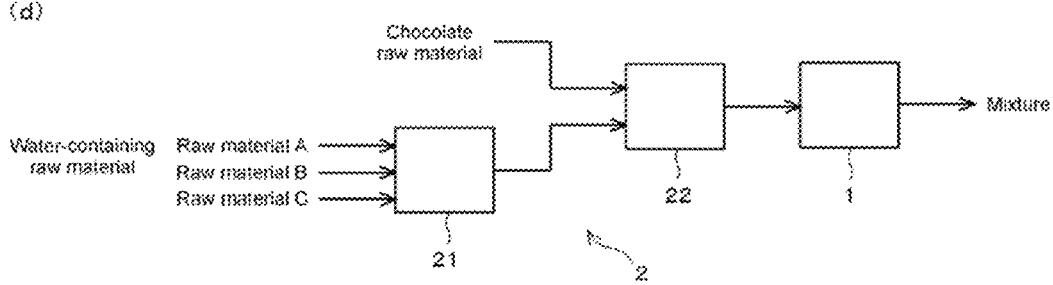

Next, embodiments of mixing a chocolate raw material and a water-containing raw material will be described with reference to FIG. 2. FIG. 2 is block diagrams illustrating embodiments of mixing a chocolate raw material and a water-containing raw material.

In the embodiment of FIG. 2(a), in mixing step 1, the chocolate raw material and the water-containing raw material are mixed under cooling to obtain a mixture.

In the embodiment of FIG. 2(b), the water-containing raw material is composed of a plurality of raw materials A to C. In the present embodiment, in mixing step 1, the chocolate raw material and the plurality of raw materials A to C composing the water-containing raw material are mixed under cooling to obtain a mixture.

In the embodiment of FIG. 2(c) as well, the water-containing raw material is composed of a plurality of raw materials A to C. In the present embodiment, pre-mixing step 2 is provided before mixing step 1. In pre-mixing step 2, the plurality of raw materials A to C composing the water-containing raw material are mixed. This mixing may be carried out at normal temperature or under cooling. By this mixing, a pasty mixture of the water-containing raw material containing raw materials A to C is obtained. Then, in mixing step 1, the chocolate raw material and the pasty mixture of the water-containing raw material are mixed under cooling to obtain a mixture. According to the present embodiment, the water activity of the mixture can be further reduced.

In the embodiment of FIG. 2(d) as well, the water-containing raw material is composed of a plurality of raw materials A to C. In the present embodiment, first pre-mixing step 21 and second pre-mixing step 22 are provided as pre-mixing step 2 before mixing step 1. In first pre-mixing step 21, the plurality of raw materials A to C composing the water-containing raw material are mixed. This mixing may be carried out at normal temperature or under cooling. By this mixing, a pasty mixture of the water-containing raw material containing raw materials A to C is obtained. Then, in second pre-mixing step 22, the chocolate raw material and the pasty mixture of the water-containing raw material are mixed. This mixing may be carried out at normal temperature or under cooling. By this mixing, a thick kneaded mixture of the chocolate raw material and the water-containing raw material is obtained. Then, in mixing step 1, the thick kneaded mixture is further mixed under cooling to obtain a mixture. According to the present embodiment, the water activity of the mixture can be further reduced as compared with the embodiment of (c) above.

In the embodiments of (b) to (d) described above, the raw materials composing the water-containing raw material is not limited to three raw materials, and may be two or more raw materials. In addition, in the embodiments of (a) to (d) described above, the chocolate raw material may be composed of a plurality of raw materials. In this case, the plurality of raw materials composing the chocolate raw material may be mixed in mixing step 1 or may be mixed in advance before being subjected to mixing step 1. In the embodiments of (a) to (d) described above, the mixer used in pre-mixing step 2 is not particularly limited, and any mixer known in the art can be used.

[Water-Containing Chocolate-Like Confectionery]

The water-containing chocolate-like confectionery according to one embodiment of the first aspect of the invention contains a mixture obtained by the method for producing a water-containing chocolate-like confectionery described above. Thereby, the effect of excellent flavor quality can be obtained.

(Second Aspect)

The second aspect of the invention relates to a method for producing a water-containing chocolate-like confectionery that can easily produce a water-containing chocolate-like confectionery emulsified into an oil-in-water type, and a water-containing chocolate-like confectionery.

The problem to be solved by the second aspect of the invention will be described.

The conventional technique has been found to have room for further improvement from the viewpoint of easily producing a water-containing chocolate-like confectionery given storage stability that allows distribution at normal temperature and emulsified into an oil-in-water type.

An object of the second aspect of the invention is to provide a method for producing a water-containing chocolate-like confectionery that can easily produce a water-containing chocolate-like confectionery given storage stability that allows distribution at normal temperature and emulsified into an oil-in-water type, and a water-containing chocolate-like confectionery.

Hereinafter, embodiments of the method for producing a water-containing chocolate-like confectionery and water-containing chocolate-like confectionery according to the second aspect of the invention will be described.

[Method for Producing Water-Containing Chocolate-Like Confectionery]

The method for producing a water-containing chocolate-like confectionery according to one embodiment of the second aspect of the invention comprises: a paste preparation step of mixing a powder raw material and a water-based raw material to prepare a paste: and a cooling mixing step of mixing the paste and an oil-based raw material under cooling to obtain an oil-in-water type emulsified mixture, wherein the mixture has a water content of 3 to 20% by weight, and has a water activity of 0.7 or less. Thereby, the effect of being able to easily produce a water-containing chocolate-like confectionery given storage stability that allows distribution at normal temperature and emulsified into an oil-in-water type can be obtained.

The method for producing a water-containing chocolate-like confectionery according to one embodiment of the second aspect of the invention will be described in further detail with reference to FIG. 3.

Figure 3:
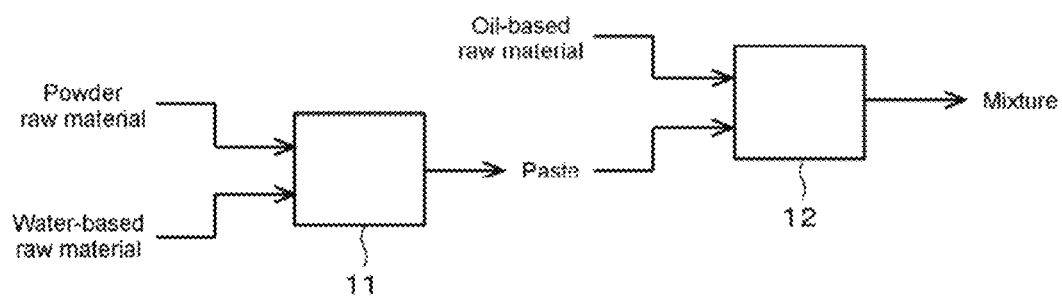
FIG. 3 is a block diagram illustrating a method for producing a water-containing chocolate-like confectionery according to one embodiment of the second aspect of the invention.

As shown in FIG. 3, the production method according to one embodiment includes paste preparation step 11 of mixing a powder raw material and a water-based raw material to prepare a paste, and cooling mixing step 12 of mixing the paste and an oil-based raw material under cooling to obtain a mixture.

In the production method according to one embodiment, the obtained mixture has a water content of 3 to 20% by weight, has a water activity (hereinafter, sometimes referred to as "Aw") of 0.7 or less, and is emulsified into an oil-in-water type.

Thereby, the effect of being able to easily produce a water-containing chocolate-like confectionery given storage stability that allows distribution at normal temperature and emulsified into an oil-in-water type can be obtained. This effect will be described in further detail below.

In the present embodiment, the "water-containing chocolate-like confectionery" is not limited to the case of "chocolates" in the Fair Competition Rules stipulated by the Federation of Fair Trade Conferences of Japan, and may be, for example, any confectionery containing the above mixture obtained by using a cacao-derived component in any one or more of a powder raw material, a water-based raw material, and an oil-based raw material may be used. For the cacao-derived component, the description thereof given in the first aspect is applied.

Examples of a conventional water-containing chocolate include "Nama-chocolate." The Nama-chocolate is produced by fully mixing fresh cream and chocolate under heating to obtain a creamy mixture, and then by cooling and forming the mixture. Here, according to the conventional production method, the chocolate is produced through a plurality of apparatuses and steps for milling, mixing, refining, conching, and the like of raw materials such as a cacao raw material, a sugar, and a milk powder. Because of this, the conventional production method using chocolate has a complicated production step and cannot be easily carried out.

In contrast, in the production method according to one embodiment of the second aspect of the invention, it is not always necessary to use chocolate, and thus the production step is greatly simplified. Because of this, a water-containing chocolate-like confectionery can be easily produced.

In addition, the mixture obtained by the production method according to one embodiment has a water content of 3 to 20% by weight, has a water activity of 0.7 or less, and is emulsified into an oil-in-water type. Thereby, the mixture and the water-containing chocolate-like confectionery containing the mixture are preferably given storage stability that allows distribution at normal temperature.

Paste preparation step 11 will be described in further detail. As described above, in paste preparation step 11, a powder raw material and a water-based raw material are mixed to prepare a paste.

By providing such a paste preparation step, the water activity of the mixture obtained in the subsequent cooling mixing step can be reduced. For example, the water activity can be reduced even though the mixture has the same formulation, as compared with when all the raw materials are collectively subjected to the cooling mixing step by omitting the paste preparation step. The reason for obtaining such an effect is, although it is not intended to limit the second aspect of the invention, presumed as follows. That is, it is thought that by dissolving and dispersing the powder raw material in the water-based raw material in advance and mixing the same, a soluble component is dissolved and dispersed without being inhibited by the oil and thus the water activity can be lowered, as compared with the method of mixing all collectively.

The powder raw material used in the paste preparation step may be any powder composed of a food component, and is preferably composed of one or two or more selected from the group consisting of a powder that is soluble in water contained in the water-based raw material and a powder that can be dispersed in the water-based raw material.

Examples of such a powder raw material include a sugar, a dairy raw material, a plant powder, and cocoa powder.

Examples of the sugar include sucrose, fructose, lactose, a sugar alcohol, and an oligosaccharide. Examples of the dairy raw material include whole milk powder, skim milk powder, and a milk protein. Examples of the plant powder include a fruit juice powder, a vegetable powder, and a plant extract powder. Here, the "powder that can be dispersed in the water-based raw material" is preferably, for example, a powder that can be stably dispersed in the water-based raw material by a simple operation such as stirring or mixing using a spatula or a whisk.

The water-based raw material used in the paste preparation step is not particularly limited as long as it is a raw material containing water. Examples of such a water-based raw material include water, an aqueous solution, an aqueous dispersion, and an extract. Specific examples thereof include fresh cream, milk, concentrated milk, a fruit juice, a sugar liquid, an alcohol, and a flavoring.

The water content of the water-based raw material can be appropriately set in consideration of the water content of the mixture obtained later by the cooling mixing step, and can be set to, as an example, 5 to 100% by weight, 10 to 95% by weight, and further 15 to 90% by weight, based on the total weight of the water-based raw material.

In the paste preparation step, another raw material other than the powder raw material and the water-based raw material described above can be blended as long as the object of the second aspect of the invention is not impaired. The another raw material is not particularly limited as long as it is a food raw material, and examples thereof include a dairy product such as a butter and a cheese.

The content (mixing ratio) of the powder raw material, the water-based raw material and the another raw material contained in the paste can be appropriately set in consideration of the water content of the mixture obtained later by the cooling mixing step. In addition, according to the present embodiment, by adjusting the mixing ratio of these raw materials, the effect of being able to preferably adjust the texture and flavor of the water-containing chocolate-like confectionery can also be obtained.

The mixing unit used in the paste preparation step is not particularly limited as long as the mixing unit can mix a powder raw material, a water-based raw material, and if necessary, another raw material to form a paste. Specific examples thereof include a vertical mixer, a desktop mixer, a cutter mixer, and a horizontal axis mixer.

In the paste preparation step, the raw materials described above are each mixed under heating at preferably 10 to 70° C., more preferably 20 to 60° C., and further preferably 30 to 50° C. The mixing unit preferably includes a temperature adjusting unit such as a heater for heating the raw materials to be mixed within the above temperature range.

By mixing within the above temperature range, dissolution and dispersion of the components contained in the raw materials described above can be promoted, and a paste in which the components are uniformly dispersed can be efficiently prepared. In addition, a component such as a milk protein (casein or the like) that is difficult to disperse in water is also uniformly dispersed in the paste in the paste preparation step.

The mixing unit used in the paste preparation step may be a batch type or a continuous type, and from the viewpoint of continuously performing a series of steps from the paste preparation step to the subsequent cooling mixing step, the mixing unit is preferably a continuous type. The continuous type mixing unit is configured to mix the continuously supplied raw materials and continuously discharge the paste.

Here, the discharged paste is preferably continuously supplied to the cooling mixing unit used in the subsequent cooling step.

The paste obtained by the paste preparation step is preferably in a state in which the soluble components in the raw materials used are dissolved and the insoluble components are uniformly dispersed. The paste in such a state further preferably has a texture without roughness. The paste having a texture without roughness has, for example, a particle size of 20 μm or less as measured using a micrometer.

Next, cooling mixing step 12 will be described in further detail. As described above, in cooling mixing step 12, the paste obtained in paste preparation step 11 and an oil-based raw material are mixed under cooling to prepare a mixture. In a certain embodiment, the paste and the oil-based raw material are mixed while being cooled to, for example, 30° C. or less, 28° C. or less, 25° C. or less, 20° C. or less, and further 15° C. or less. The lower limit of the cooling temperature is not particularly limited, and can be, for example, −20° C. or more. By performing such cooling, when the paste containing the water-based raw material and the oil-based raw material are mixed, separation of the oil is suppressed, and a mixture having a stable, oil-in-water type emulsified state in which the oil is uniformly dispersed in the continuous phase of water is obtained. In addition, the water activity of the mixture can be preferably reduced by uniformly dispersing the components.

Kneading in a state where the fat in the oil-based raw material is solidified by cooling is preferable. In the present embodiment, the "state in which the fat in the oil-based raw material is solidified" means a state in which 65% by weight or more of all the fat in the oil-based raw material to be kneaded are solidified. For the oil-based raw material, if the solid fat content (SFC) measured at a certain temperature is 85% by weight or more of all the fat in the oil-based raw material, kneading can be carried out in a state in which the fat in the oil-based raw material is solidified at the temperature. Here, the solid fat content is a value measured by a nuclear magnetic resonance (NMR) method.

The oil-based raw material used in the cooling mixing step is a raw material containing fat, and examples thereof include fat and an emulsion having an oil as a continuous phase. Specific examples thereof include cocoa butter, cacao mass, a cocoa butter substitute fat, a vegetable fat, shortening, and various spreads.

The content of the fat in the oil-based raw material is not particularly limited, and can be, as an example, 5 to 100% by weight, 30 to 80% by weight, and further 40 to 60% by weight based on the total weight of the oil-based raw material. The content of the fat is a value measured by the method described in the first aspect.

The oil-based raw material preferably has the property of becoming solid at normal temperature (20° C.) or solid at around 0° C. as the whole oil-based raw material blended into the mixture obtained in the cooling mixing step. Here, the "whole oil-based raw material" refers to, if there is one oil-based raw material, the oil-based raw material, and refers to, if there are two or more oil-based raw materials, a mixture of these oil-based raw materials. The weight ratio of each oil-based raw material in such a mixture of oil-based raw materials is the weight ratio of each oil-based raw material blended into the mixture obtained in the cooling mixing step.

The cooling mixing unit used in the cooling mixing step is not particularly limited and may be any one that can mix the paste and the oil-based raw material under cooling. For the cooling mixing unit, the description of the cooling mixer given in the first aspect is applied. As the cooling mixing unit of the second aspect, the cooling mixer described in the first aspect can be used for mixing the paste and the oil-based raw material under cooling.

In a preferred embodiment, in the cooling kneading section of the extruder as the cooling mixing unit, the paste and the oil-based raw material are kneaded by a screw in a state of being cooled to, for example, 30° C. or less, 28° C. or less, 25° C. or less, 20° C. or less, and further 15° C. or less.

The paste from the paste preparation step of the previous stage and the oil-based raw material are preferably continuously supplied to the inlet of the extruder.

The mixture obtained by the cooling mixing step has a water content of 3 to 20% by weight, has a water activity of 0.7 or less, and is emulsified into an oil-in-water type.

The mixture obtained by the production method according to the present embodiment can be formed while separation of the oil does not occur even if the amount of fresh cream blended is smaller than that of general Nama-chocolate. In addition, such a mixture can be formed even if the mixture has a lower water content than general Nama-chocolate.

The mixture obtained by the production method of the present embodiment has a good texture, and the mixture obtained by using a general mixer in the cooling mixing step has a texture like a baked confectionery. In addition, the mixture obtained using the extruder in the cooling mixing step has a very smooth texture even if the solid content is high, and has extremely improved melt-in-the-mouth as compared with the mixture obtained using the above-mentioned mixer.

In the above description, the mixing of the raw materials in the paste preparation step is not limited to the mixing of the raw materials performed by one mixing unit, and may be performed by sequentially supplying the raw materials to a plurality of mixing units. In addition, the mixing of the raw materials in the cooling mixing step is not limited to the mixing of the raw materials performed by one mixing unit, and may be performed by sequentially supplying the raw materials to a plurality of mixing units.

The method for producing a water-containing chocolate-like confectionery according to an embodiment of the second aspect of the invention further includes a forming step of forming the mixture obtained in the cooling mixing step. The mixture has plasticity suitable for forming, and thus can be formed into a preferred shape and size. The forming method used in the forming step is not particularly limited, and for example, any shape can be given according to the opening shape of the die (base) provided at the discharge port of the mixing cooling unit.

[Water-Containing Chocolate-Like Confectionery]

The water-containing chocolate-like confectionery according to one embodiment of the second aspect of the invention contains a mixture obtained by the method for producing a water-containing chocolate-like confectionery described above. Thereby, the effect of giving storage stability that allows distribution at normal temperature to the water-containing chocolate-like confectionery can be obtained.

Unless otherwise specified, the physical properties, measured values, and the like described in the present specification are observed in an environment of 20° C.

EXAMPLES

Hereinafter, the invention will be described further specifically with reference to Examples, but the scope of the invention is not limited to the description of these Examples. In the following Examples, "%" represents "% by weight" unless otherwise specified.

[Measurement Methods]

First, methods for measuring water activity, water content, the emulsified state, and stress measured for a mixture or the like in the following Examples and Comparative Examples will be described.

(1) Water Activity

The measurement was performed using a water activity measuring instrument ("AquaLab Series 4TE" manufactured by METER Group, Inc.).

(2) Water Content

According to "Attachment: Analysis methods of nutritional components, etc." 5. Carbohydrate a. Water (3) Method of Heating and drying under reduced pressure, "Attachment: Nutrition Labeling" (http://www.caa.go.jp/policies/poficy/food_labeingfood_labeling_act/pdffoods_index_18_180119_0003.pdf) on the Consumer Affairs Agency website of Japan, the measurement was performed by the following procedure.

[Method of Heating and Drying Under Reduced Pressure]

The constant weight ($W_0$ (g)) of a weighing dish (with a lid) having a bottom diameter of 50 mm is determined. Next, 2 g of a sample is collected in the weighing dish and weighed ($W_1$ (g)). Next, with the lid of the weighing dish displaced, the dish is placed in a vacuum dryer regulated to 100° C., and the degree of decompression is set to 25 mmHg while sucking using a vacuum pump. After drying under reduced pressure for 2 hours, the vacuum pump is stopped, dehumidified air is gently introduced into the vacuum dryer to return to normal pressure, the weighing dish is taken out, the lid is closed, and a constant weight ($W_2$ (g)) is determined. The water content in the sample is calculated by the following expression.

$$\text{Water content (\% by weight) in the sample} = \{(W_1 - W_2)/(W_1 - W_0)\} \times 100$$

(3) Emulsified State

The electrical resistance of the mixture, which is a sample for measurement, is measured using a tester, and if a constant electrical resistance value is shown even if the measurement site is varied, the mixture is considered to be an oil-in-water type, and if the electrical resistance shows infinity, the mixture is considered to be a water-in-oil type.

(4) Stress

As a sample for measurement, a mixture formed into a substantially rectangular parallelepiped shape (height of about 7 mm) was used, and the measurement was performed using the following instrument. The room temperature at the time of measurement was 20° C.

Measuring instrument: FUDOH rheometer RTC-3010D-CW

Plunger: Cylindrical plunger (metal material) having a diameter of 3 mm

Plunger approach speed: 2 cm/min

Plunger approach depth: 3 mm

Under the above conditions, the obtained stress was evaluated according to the following evaluation criteria.

The "stress" referred to below means the maximum value (Peak) of the measured stress.

10 kgf or more: The texture feels very hard.

0.7 kgf or more and less than 10 kgf: The texture feels hard.

4 kgf or more and less than 7 kgf: The texture feels slightly hard.

3 kgf or more and less than 4 kgf: The texture feels slightly soft.

2 kgf or more and less than 3 kgf: The texture feels soft.

Less than 2 kgf: The texture feels very soft.

[Preparation of Chocolate Raw Materials]

(Milk Chocolate Base)

The milk chocolate base was prepared by mixing, milling, and conching 20 parts by weight of cacao mass, 20 parts by weight of cocoa butter, 20 parts by weight of whole milk powder, 0.5 parts by weight of an emulsifier, 0.1 parts by weight of a flavoring, and 40 parts by weight of sucrose by a conventional method.

(White Chocolate Base)

The white chocolate base was prepared by mixing, milling, and conching 30 parts by weight of cocoa butter, 30 parts by weight of whole milk powder, 0.5 parts by weight of an emulsifier, 0.1 parts by weight of a flavoring, and 40 parts by weight of sucrose by a conventional method.

(High Cacao Chocolate Base)

The high cacao chocolate base was prepared by mixing, milling, and conching 75 parts by weight of cacao mass, 10 parts by weight of cocoa butter, 5 parts by weight of cocoa powder, 0.5 parts by weight of an emulsifier, 0.1 parts by weight of a flavoring, and 10 parts by weight of sucrose by a conventional method.

[Production of Water-Containing Chocolate-Like Confectionery]

Example 1

90.9% by weight of milk chocolate base and 9.1% by weight of a whole egg (water content of 76%) as a water-containing raw material were fed into a twin-screw extruder, and cooling transfer, kneading, and extrusion were performed under the following operation conditions. The extruded mixture was cut into a size approximately 2 cm square to obtain a water-containing chocolate-like confectionery.

Extruder Operation Conditions

Raw material feed temperature: 20° C.

Internal temperature of the cooling region: 8 to 19° C.

Discharge temperature (surface): 25.6° C.

Here, the "internal temperature of cooling region" is the temperature of the mixture passing through the cooling kneading section described above. The "discharge temperature (surface)" is the surface temperature of the mixture discharged from the discharge port.

The water activity of the obtained water-containing chocolate-like confectionery was 0.70, and the water content was 7% by weight. In addition, the emulsion type of this water-containing chocolate-like confectionery was an oil-in-water type. When this water-containing chocolate-like confectionery was stored at 40° C. for 3 hours and then picked up with fingers, the confectionery was able to be lifted up without deformation.

Comparative Example 1

The milk chocolate base and a whole egg having exactly the same formulation as in Example 1 were fed into a bowl and mixed using a whisk and a rubber spatula until they were uniform to obtain a water-containing chocolate-like confectionery composed of the mixture.

The water activity of the obtained water-containing chocolate-like confectionery was 0.76, and the water content was 7% by weight. In addition, the emulsion type of this water-containing chocolate-like confectionery was undeterminable. Although the confectionery seemed to be uniformly mixed in appearance, in the emulsion type measurement, there were some conductive sites and some non-conductive sites depending on the measurement points, indicating a variation. It can be seen that although the formulations of Example 1 and Comparative Example 1 are exactly the same, the water-containing chocolate-like confectionery having a lower water activity can be obtained in Example 1.

Example 2

74.3% by weight of milk chocolate base, 2.2% by weight of Chocoseed B (manufactured by Fuji Oil Co., Ltd.), and 23.5% by weight of sorbitol (water content of 30%) as a water-containing raw material were fed into a twin-screw extruder, and cooling transfer, kneading, and extrusion were performed under the following operation conditions. The extruded mixture was cut into a size approximately 2 cm square to obtain a water-containing chocolate-like confectionery.

Extruder Operation Conditions

Raw material feed temperature: 20° C.

Internal temperature of cooling region: 9 to 25° C.

Discharge temperature (surface): 10 to 22° C.

The emulsion type of the obtained water-containing chocolate-like confectionery was an oil-in-water type. The water activity of this water-containing chocolate-like confectionery was 0.62, the water content was 6.00% by weight, and the stress was 0.52 kgf, and the confectionery had a very soft texture.

In order to evaluate the storage stability, when the obtained water-containing chocolate-like confectionery was stored in a freezer at 13° C., 20° C., 23° C., 25° C., and 28° C. for 3 months and then the stress was measured, the stress values were 0.56, 0.70, 0.77, 0.79, 0.90, and 0.92 kgf, respectively, and a very soft texture was maintained in all the temperature zones. In addition, all the confectioneries retained plasticity even after being stored for 3 months. In addition, the water activity of the confectioneries after storage was 0.7 or less in all the storage temperature zones.

Example 3

The raw materials shown in Table 1 were fed into an extruder, and cooling transfer, kneading, and extrusion were performed under the following operation conditions. The extruded mixture was cut into a size approximately 2 cm square to obtain a water-containing chocolate-like confectionery.

Extruder Operation Conditions

Raw material feed temperature: 23 to 24° C.

Internal temperature of cooling region: 1 to 11° C.

Discharge temperature (surface): 21.9 to 24.8° C.

TABLE 1

|  |  | Test plot 3-1 | Test plot 3-2 | Test plot 3-3 | Test plot 3-4 | Test plot 3-5 | Test plot 3-6 |
|---|---|---|---|---|---|---|---|
| Chocolate raw material | White chocolate base | 86.7% | 80.0% | 73.3% | 88.8% | 83.3% | 77.6% |
| Water-containing raw materials | Strawberry juice (water content of 35.9%) | — | — | — | 11.2% | 16.7% | 22.4% |
|  | Sorbitol (water content of 30%) | 13.3% | 20.0% | 26.7% | — | — | — |
| Mixture (water-containing chocolate-like confectionery) | Water content | 4.0% | 6.0% | 8.0% | 4.0% | 6.0% | 8.0% |
|  | Water activity Aw | 0.60 | 0.64 | 0.64 | 0.58 | 0.58 | 0.62 |
|  | Stress (kgf) | 1.10 | 0.56 | 0.34 | 1.64 | 1.17 | 0.58 |
|  | Emulsion type | Oil-in-water | Oil-in-water | Oil-in-water | Oil-in-water | Oil-in-water | Oil-in-water |

In all of test plots 3-1 to 3-6, the emulsion type of each of the obtained water-containing chocolate-like confectioneries was an oil-in-water type, the water activity was 0.7 or less, the stress was 2 kgf or less, and the confectionery had a very soft texture.

In order to evaluate the storage stability, each water-containing chocolate-like confectionery was stored at 28° C., 35° C., and 40° C. for 24 hours. All the confectioneries after storage maintained their shape before storage. In addition, when each confectionery was picked up with fingers, the confectionery stored at 28° C. did not adhere to the fingers and was not deformed, and was able to be easily lifted up. The confectioneries stored at 35° C. or more were very soft but were able to be lifted up with care.

Further, each water-containing chocolate-like confectionery was stored at 4° C. 13° C., 20° C., 23° C., and 28° C. for 0 to 8 months. The confectioneries after storage maintained an Aw of 0.7 or less in all the storage temperature zones and after all the storage periods. In addition, all the confectioneries had plasticity.

Example 4

The raw materials shown in Table 2 were fed into an extruder, and cooling transfer, kneading, and extrusion were performed under the operation conditions shown in Table 2. The water-containing chocolate-like confectioneries obtained by extrusion were cut into a size approximately 2 cm square.

In all of test plots 4-1 to 4-7, the emulsion type of each of the obtained water-containing chocolate-like confectioneries was an oil-in-water type, the water activity was 0.7 or less, the stress was in the range of 2 to 7 kgf. When the water-containing chocolate-like confectioneries were eaten, the confectioneries having a water content of 4% had the same hardness as a commercially available chocolate bar, and the confectioneries having a water content of 6% or more had the same hardness as a commercially available chocolate having a slightly soft texture.

In order to evaluate the heat resistance, each water-containing chocolate-like confectionery was stored at 28° C. 35° C., and 40° C. for 24 hours. All the confectioneries after storage maintained their shape before storage. Further, when each confectionery was picked up with fingers, the confectionery stored at 28° C. did not adhere to the fingers and was not deformed, and was able to be easily lifted up. The confectioneries stored at 35° C. or more were very soft but were able to be lifted up with care.

In order to evaluate the storage stability, each water-containing chocolate-like confectionery was stored at 4° C., 13° C., 20° C., 23° C., and 28° C. for 0 to 6 months. The confectioneries after storage maintained an Aw of 0.7 or less in all the storage temperature zones and after all the storage periods. In addition, all the confectioneries had plasticity.

Example 5

77.6% by weight of milk chocolate base and 22.4% by weight of strawberry juice (water content of 35.9%) as a

TABLE 2

|  |  | Test plot 4-1 | Test plot 4-2 | Test plot 4-3 | Test plot 4-4 | Test plot 4-5 | Test plot 4-5 | Test plot 4-7 |
|---|---|---|---|---|---|---|---|---|
| Chocolate raw material | High cacao chocolate base | 86.7% | 80.0% | 73.3% | 88.8% | 83.3% | 77.6% | 79.3% |
| Water-containing raw materials | Sorbitol (water content of 30%) | 13.3% | 20.0% | 26.7% | — | — | — | — |
|  | Strawberry juice (water content of 35.9%) | — | — | — | 11.2% | 16.7% | 22.4% | — |
|  | Gouda cheese (water content of 44%) | — | — | — | — | — | — | 20.7% |
| Extruder operation conditions | Raw material feed temperature | 28.8 to 30.1° C. | | | 28.4 to 28.6° C. | | | 28.1° C. |
|  | Discharge temperature (surface) | 25.0 to 27.4° C. | | | 27.0 to 31.2° C. | | | 26.0° C. |
|  | Internal temperature of cooling region | −1 to 7° C. | | | 1 to 14° C. | | | 2 to 8° C. |
| Mixture (water-containing chocolate-like confectionery) | Water content | 4.0% | 6.0% | 8.0% | 4.0% | 6.0% | 8.0% | 9.1% |
|  | Water activity Aw | 0.54 | 0.59 | 0.61 | 0.56 | 0.59 | 0.60 | 0.61 |
|  | Stress (kgf) | 6.55 | 2.98 | 2.15 | 5.04 | 3.48 | 2.22 | 2.33 |
|  | Emulsion type | Oil-in-water | Oil-in-water | Oil-in-water | Oil-in-water | Oil-in-water | Oil-in-water | Oil-in-water | water-containing raw material were fed into an extruder, and cooling transfer, kneading, and extrusion were performed under the following operation conditions. The extruded mixture was cut into a size approximately 2 cm square to obtain a water-containing chocolate-like confectionery.

Extruder Operation Conditions
  Raw material feed temperature: 28.7° C.
  Internal temperature of cooling region: 2 to 7° C.
  Discharge temperature (surface): 23.2° C.

The emulsion type of the obtained water-containing chocolate-like confectionery was an oil-in-water type. The water activity of this water-containing chocolate-like confectionery was 0.62, the water content was 8.03% by weight, and the stress was 0.52 kgf, and the confectionery had a very soft texture.

performed under the same operation conditions as in Example 5. The extruded mixture was cut into a size approximately 2 cm square to obtain a water-containing chocolate-like confectionery. In Example 6, the following sugar liquids were used as the water-containing raw material.

Water-Containing Raw Material (Sugar Liquids)
  Meioligo G (manufactured by Meiji Food Materia Co., Ltd., water content of 24%)
  Coupling Sugar (manufactured by Hayashibara Co., Ltd., water content of 25%)
  Koso Syrup (manufactured by Japan Corn Starch Co., Ltd., water content of 25%)

TABLE 3

|  |  | Test plot 6-1 | Test plot 6-2 | Test plot 6-3 | Test plot 6-4 |
|---|---|---|---|---|---|
| Chocolate raw materials | White chocolate base | 66.7% | 68.0% | 68.0% | — |
|  | High cacao chocolate base | — | — | — | 75.5% |
| Water-containing raw materials | Meioligo G (water content of 24%) | 33.3% | — | — | 24.5% |
|  | Coupling Sugar (water content of 25%) | — | 32.0% | — | — |
|  | Koso Syrup (water content of 25%) | — | — | 32.0% | — |
| Mixture (water-containing chocolate-like confectionery) | Water content | 8.0% | 8.0% | 8.0% | 5.9% |
|  | Water activity Aw | 0.64 | 0.64 | 0.63 | 0.43 |
|  | Emulsion type | Oil-in-water | Oil-in-water | Oil-in-water | Oil-in-water |

In order to evaluate the heat resistance, the obtained water-containing chocolate-like confectionery was stored at 28° C., 35° C., and 40° C. for 24 hours. The confectioneries after storage maintained their shape before storage. Further, when each confectionery was picked up with fingers, the confectionery stored at 28° C. did not adhere to the fingers and was not deformed, and was able to be easily lifted up. The confectioneries stored at 35° C. or more were very soft but were able to be lifted up with care.

In order to evaluate the storage stability, the obtained water-containing chocolate-like confectionery was stored at 4° C., 13° C., 20° C., 23° C., and 28° C. for 0 to 4 months. The confectioneries after storage maintained an Aw of 0.7 or less in all the storage temperature zones and after all the storage periods. The confectioneries after storage had plasticity.

Example 6

The raw materials shown in Table 3 were fed into an extruder, and cooling transfer, kneading, and extrusion were In all of test plots 6-1 to 6-4, the emulsion type of each of the obtained water-containing chocolate-like confectioneries was an oil-in-water type, and the Aw was 0.7 or less.

In order to evaluate the storage stability, the water-containing chocolate-like confectionery of test plot 6-4 was stored at 4° C., 13° C., 20° C., 23° C., and 28° C. for 0 to 5 months. The confectioneries after storage maintained an Aw of 0.7 or less in all the storage temperature zones and after all the storage periods. The confectioneries after storage all had plasticity.

Example 7

The raw materials shown in Table 4 were fed into an extruder, and cooling transfer, kneading, and extrusion were performed under the operation conditions shown in Table 4. The extruded mixture was cut into a size approximately 2 cm square to obtain a water-containing chocolate-like confectionery. In Table 4, "Meioligo G" is a sugar liquid (manufactured by Meij Food Materia Co., Ltd., water content of 24%).

TABLE 4

|  |  | Test plot 7-1 | Test plot 7-2 | Test plot 7-3 | Test plot 7-4 | Test plot 7-5 | Test plot 7-6 |
|---|---|---|---|---|---|---|---|
| Chocolate raw materials | High cacao chocolate base | 80.0% | — | — | 84.1% | 77.3% | 77.3% |
|  | Cocoa butter | — | 33.3% | — | — | — | — |
|  | Low melting point fat | — | — | 33.3% | — | — | — |
|  | Cocoa powder | — | 47.6% | 47.6% | — | — | — |

TABLE 4-continued

|  |  | Test plot 7-1 | Test plot 7-2 | Test plot 7-3 | Test plot 7-4 | Test plot 7-5 | Test plot 7-6 |
|---|---|---|---|---|---|---|---|
| Water-containing raw materials | Meioligo G (water content of 24%) | — | — | — | 15.9% | 22.7% | — |
|  | Starch syrup (water content of 25%) | — | 19.1% | 19.1% | — | — | 22.7% |
|  | Cacao juice (water content of 40%) | 20.0% | — | — | — | — | — |
| Extruder operation conditions | Raw material feed temperature | 30.0 to 33.2° C. | | | | | |
|  | Discharge temperature (surface) | 27.3° C. | 28.1° C. | 21.0° C. | 28.8° C. | 27.9° C. | 31.9° C. |
|  | Internal temperature of cooling region | 3 to 6° C. | 4 to 7° C. | 2 to 7° C. | 5 to 11° C. | 5 to 12° C. | 5 to 15° C. |
| Mixture (water-containing chocolate-like confectionery) | Water content | 10.1% | 6.5% | 4.9% | 7.4% | 7.1% | 6.1% |
|  | Water activity Aw | 0.69 | 0.52 | 0.56 | 0.56 | 0.59 | 0.52 |
|  | Stress (kgf) | 2.14 | 2.49 | 0.97 | 3.12 | 1.57 | 6.13 |
|  | Emulsion type | Oil-in-water | Oil-in-water | Oil-in-water | Oil-in-water | Oil-in-water | Oil-in-water |

In all of test plots 7-1 to 7-6, the emulsion type of each of the obtained water-containing chocolate-like raw materials was an oil-in-water type, and the Aw was 0.7 or less. In addition, the stress was in the range of 2 to 7 kgf. When these were eaten, the confectioneries containing starch syrup had a slightly hard texture, whereas confectioneries containing fat and cocoa powder instead of the chocolate base and confectioneries containing a water-containing raw material having a water content of 40% or more had the same hardness as a commercially available chocolate having a slightly soft texture and had a soft texture.

Example 8

68% by weight of milk chocolate base and 32% by weight of a sugar liquid ("Meioligo G" manufactured by Meiji Food Materia Co., Ltd., water content of 24%) as a water-containing raw material were fed into an extruder, and cooling transfer, kneading, and extrusion were performed under the following operation conditions. The extruded mixture was cut into a size approximately 2 cm square to obtain a water-containing chocolate-like confectionery.
Extruder Operation Conditions
  Raw material feed temperature: 4° C.
  Internal temperature of cooling region: 0.4 to 6.4° C.
  Discharge temperature (surface): 24.8 to 25.7° C.
  The emulsion type of the obtained water-containing chocolate-like confectionery was an oil-in-water type. The water activity of this water-containing chocolate-like confectionery was 0.81, the water content was 5.9% by weight, and the stress was 2.81 kgf, and the confectionery had a slightly soft texture.

Example 9

Of the formulation components shown in Table 5, the whole amounts of the skim milk powder, the whole milk powder, and a sugar raw material (fructose or granulated sugar) were fed to a mixer bowl, and a half amount of the fresh cream was fed. The jacket temperature of the mixer was adjusted to 60° C., and the raw materials were mixed for 10 minutes. When the mixed raw materials became pasty and the crystals of the sugar raw material were dissolved, the remaining fresh cream was fed, and the mixture was further mixed and stirred for 10 minutes to obtain a smooth pasty mixture. This step corresponds to the paste preparation step in the method for producing a water-containing chocolate-like confectionery according to the second aspect of the invention.

TABLE 5

|  |  | Formulation A (% by weight) | Formulation B (% by weight) |
|---|---|---|---|
| Chocolate raw material | Cacao mass | 40 | 40 |
| Water-containing raw materials | Skim milk powder | 10 | 10 |
|  | Whole milk powder | 10 | 10 |
|  | Fructose | 20 | — |
|  | Granulated sugar | — | 20 |
|  | Fresh cream | 20 | 20 |
| Total |  | 100 | 100 |

The formulation components shown in Table 5 can also be expressed as shown in Table 6 in light of the method for producing a water-containing chocolate-like confectionery according to the second aspect of the invention.

TABLE 6

|  |  | Formulation A (% by weight) | Formulation B (% by weight) |
|---|---|---|---|
| Powder raw materials | Skim milk powder | 10 | 10 |
|  | Whole milk powder | 10 | 10 |
|  | Fructose | 20 | — |
|  | Granulated sugar | — | 20 |
| Water-based raw material | Fresh cream | 20 | 20 |
| Oil-based raw material | Cacao mass | 40 | 40 |
| Total |  | 100 | 100 |

Fluid cacao mass was added to the obtained pasty mixture, and then the resulting mixture was mixed while lowering the jacket temperature of the mixer to 10° C. The mixture gradually turned white and had a brown appearance when mixed uniformly throughout. This step corresponds to the cooling mixing step (step of obtaining a thick kneaded mixture) in the method for producing a water-containing chocolate-like confectionery according to the second aspect of the invention. By sheet-forming and cutting this mixture (hereinafter, also referred to as the "thick kneaded mixture"), a water-containing chocolate-like confectionery having a texture similar to that of a baked confectionery was obtained. That is, the water-containing chocolate-like confectionery had a degree of freedom of plasticity that allowed sheet forming and subsequent cutting.

Table 7 shows the water activity immediately after production, measured for each of the pasty mixture (corresponding to the paste in the method for producing a water-containing chocolate-like confectionery according to the second aspect of the invention) and the water-containing chocolate-like confectionery mixture), for formulation A and formulation B.

TABLE 7

|  |  | Pasty mixture | Water-containing chocolate-like confectionery |
|---|---|---|---|
| Water activity Aw (water content) | Formulation A | 0.6754 (17.5%) | 0.6297 (10.5%) |
|  | Formulation B | 0.7410 (17.5%) | 0.6992 (10.5%) |

It can be seen from Table 7 that although the water activity of the mixture (water-containing chocolate-like confectionery) was 0.7 or less in both formulation A and formulation B, the water activity of formulation A containing fructose is about 0.07 lower than that of formulation B containing sucrose. In addition, it was confirmed that both mixtures were emulsified into an oil-in-water type.

Example 10

Test Plot 10-1

The thick kneaded mixture obtained in Example 9 was fed into a twin-screw extruder, and cooling transfer, kneading, and extrusion were performed under the same operation conditions as in Example 5. The extruded mixture was cut into a size approximately 2 cm square to obtain a water-containing chocolate-like confectionery.

As described above, in the present test plot 10-1, for the chocolate raw material and the water-containing raw material, the mixing described in Example 9 (that is, a combination of mixing for obtaining a pasty mixture and mixing for obtaining a thick kneaded mixture, hereinafter also referred to as "pre-mixing step A") is performed before performing mixing by the twin-screw extruder.

To put it another way in light of the method for producing a water-containing chocolate-like confectionery according to the second aspect of the invention, in the present test plot 10-1, the mixture of Example 9 (thick kneaded mixture) prepared through the paste preparation step and the cooling mixing step (step of obtaining a thick kneaded mixture) is subjected to a further cooling mixing step using a twin-screw extruder.

Test Plot 10-2 (Reference Example)

The raw materials of the same formulation as formulation A shown in Table 5 of Example 9 were collectively fed into a mixer and mixed at room temperature (25° C.) without cooling to obtain a mixture. The obtained mixture formed lumps and the fat was separated. In addition, for formulation B as well, the same result was obtained.

Test Plot 10-3

The mixture from which the fat was separated obtained in test plot 10-2 was fed into a twin-screw extruder, and cooling transfer, kneading, and extrusion were performed under the same operation conditions as in Example 5. The extruded mixture was cut into a size approximately 2 cm square to obtain a water-containing chocolate-like confectionery.

As described above, in the present test plot 10-3, for the chocolate raw material and the water-containing raw material, the mixing described in test plot 10-2 (that is, a collective mixing of raw materials at room temperature, hereinafter also referred to as "pre-mixing step B") is performed before performing mixing using the twin-screw extruder.

To put it another way in light of the method for producing a water-containing chocolate-like confectionery according to the second aspect of the invention, in the present test plot 10-3, the paste preparation step and the step of obtaining a thick kneaded mixture are omitted, the mixture obtained by collectively mixing the power raw material, the water-based raw material, and the oil-based raw material is subjected to the cooling mixing step using a twin-screw extruder.

In test plots 10-1 and 10-3, the mixture before being fed into the extruder ("Before extruder" in Table 8) and the water-containing chocolate-like confectionery one week after the discharge from the extruder ("After extruder" in Table 8) were each measured for the water activity. Results thereof are shown in Table 8.

TABLE 8

|  |  | Before extruder | After extruder |
|---|---|---|---|
| Water activity Aw | Test plot 10- (including pre-mixing step A) | 0.6624 | 0.6315 |
|  | Test plot 10-3 (including pre-mixing step B) | 0.6923 | 0.6811 |

It can be seen from Table 8 that even in the mixture having the same formulation, the chocolate-like confectionery after being cooled and kneaded by the extruder has a lower water activity than the mixture before the treatment with the extruder. It can be seen that in both test plots 10-1 and 10-3, the water activity after the extruder is lower than that before the extruder, although the formulation itself of the mixture before the extruder did not change after the extruder.

In addition, it can be seen from Table 8 that the mixture of test plot 10-1 including pre-mixing step A (a combination of mixing for obtaining a pasty mixture and mixing for obtaining a thick kneaded mixture) has a lower water activity than the mixture of test plot 10-3 including pre-mixing step B (collective mixing of raw materials at room temperature) instead of pre-mixing step A. It can be seen that when using a plurality of water-containing raw materials together, pre-mixing two or more of the plurality of water-containing raw materials to form a paste before cooling and kneading using an extruder is effective in further reducing the water activity of the water-containing chocolate-like confectionery. It can be seen that the mixture of test plot 10-1 provided with the paste preparation step has a lower water activity than the mixture of test plot 10-3 In which the paste preparation step is omitted.

In each of test plots 10-1 and 10-3, the mixture was emulsified into an oil-in-water type.

Example 11

A pasty mixture obtained by mixing a chocolate raw material (40% by weight of cacao mass) and the following water-containing raw materials (10% by weight of whole milk powder, 5% by weight of skim milk powder, 25% by weight of fructose, and 20% by weight of fresh cream) was fed into an extruder, and cooling transfer, kneading, and extrusion were performed under the following operation conditions. The extruded mixture was cut into a size approximately 2 cm square to obtain a water-containing chocolate-like confectionery.

Extruder Operation Conditions

Raw material feed temperature: 20 to 38° C. (pasty mixture, 20° C.; chocolate raw material, 38° C.)

Internal temperature of cooling region: 5 to 15° C.

Discharge temperature (surface): 25 to 27° C.

The emulsion type of the obtained water-containing chocolate-like confectionery was an oil-in-water type, the water activity was 0.6248, and the water content was 10.5%.

The obtained water-containing chocolate-like confectionery was stored at −20° C., 13° C., 20° C., 23° C., and 25° C. for 6 months, and changes in water activity, plasticity, and stress were observed. Results thereof are shown below.

Water activity: At all the storage temperatures, the water-containing chocolate-like confectionery maintained a water activity of 0.7 or less before and after storage.

Plasticity: At all the storage temperatures, the water-containing chocolate-like confectionery had the same plasticity after storage as before storage.

Stress: As shown in Table 9 below, at all the storage temperatures, the water-containing chocolate-like confectionery maintained a stress of less than 2 kgf before and after storage.

TABLE 9

| Storage temperature (° C.) | Stress before storage (kgf) | Stress after storage for 6 months (kgf) |
| --- | --- | --- |
| −20 | 0.52 | 0.57 |
| 13 | 0.52 | 0.72 |
| 20 | 0.52 | 0.72 |
| 23 | 0.52 | 0.92 |
| 25 | 0.52 | 0.96 |
| 28 | 0.52 | 1.09 |

A sensory evaluation of this water-containing chocolate-like confectionery and the water-in-oil type chocolate (control product) produced by replacing a half amount of the fresh cream in the above formulation with vegetable fat and milk fat was carried out by 30 chocolate special panelists trained to the extent that they could give the same sample the same score. The evaluation items were as follows, and the average value was calculated from the obtained results.

Evaluation Items

Time from putting in mouth to swallowing: The time was measured for each of the Example product and the control product.

Flavors: Bitterness, astringency, sourness, sweetness, and aroma intensity for each stage of the flavor felt first after putting the product in the mouth (top), the flavor felt in the middle (middle), and the flavor felt as a lingering finish in the second half (last) were evaluated on a 5-point scale with the flavor of the control product as a score of "4." The criteria for scoring were "1: very weak," "2: weak," "3: slightly weak," "4: comparable," and "5: strong."

Results thereof are shown in Table 10.

TABLE 10

| | | | Control product | Example 11 |
| --- | --- | --- | --- | --- |
| Time from putting in mouth to swallowing (seconds) | | | 26.0 | 26.3 |
| Flavors | Top | Bitterness | 4 | 3.3 |
| | | Astringency | 4 | 3.5 |
| | | Sourness | 4 | 3.8 |
| | | Sweetness | 4 | 4.1 |
| | | Aroma intensity | 4 | 4.0 |
| | Middle | Bitterness | 4 | 3.6 |
| | | Astringency | 4 | 3.8 |
| | | Sourness | 4 | 3.7 |
| | | Sweetness | 4 | 4.3 |
| | | Aroma intensity | 4 | 4.5 |
| | Last | Bitterness | 4 | 3.7 |
| | | Astringency | 4 | 4.1 |
| | | Sourness | 4 | 3.8 |
| | | Sweetness | 4 | 4.7 |
| | | Aroma intensity | 4 | 4.8 |

From Table 10, the chocolate of Example 11 emulsified into an oil-in-water type was characterized by a stronger sweetness and aroma and a weaker bitterness and astringency than the control product emulsified into a water-in-oil type. The reasons for obtaining such an effect are estimated as follows. It is considered that because the emulsion type of the chocolate of the invention is an oil-in-water type, the elution of the sugar is accelerated, further the threshold value of the aroma component is lowered by the presence of water, and further the sweetness is felt from an early stage after the chocolate is put in the mouth, and thereby the bitterness and astringency are relatively suppressed.

Because the emulsion type of the chocolate of the invention is an oil-in-water type, it was predicted that the chocolate would melt in the mouth well and the eating time would be shorter, but contrary to the prediction, there was a tendency for the eating time to be slightly longer than that of the control product.

Example 12

The cut water-containing chocolate-like confectionery obtained in Example 11 was coated with melted chocolate base for coating and then cooled to obtain a chocolate-coated water-containing chocolate-like confectionery.

Example 13

The extruded mixture obtained in Example 11 was formed into a sheet having a thickness of 3 mm, white chocolate having a thickness of 3 mm was applied thereonto, and then the resulting sheet was formed into a roll and cooled and solidified to obtain a roll cake type water-containing chocolate-like confectionery.

Example 14

The extruded mixture obtained in Example 11 was formed into a sheet having a thickness of 7 mm and cut into a size of 3 cm-3.5 cm. A water-containing chocolate-like confectionery (chocolate sandwich), which was a composite confectionery in which center chocolate (thickness of 7 mm) was placed between the two sheets obtained and sandwiched such that the sheets of the mixture were each the outermost layer, was obtained.

Example 15

35% by weight of fructose, 27% by weight of butter, 20% by weight of fresh cream, 13% by weight of a milk powder raw material, and 5% by weight of granulated sugar were heated and mixed, and when the sugar raw material was melted at around 70° C., the mixture was stirred and mixed using a cutter mixer to obtain an emulsified center cream.

Using an encrusting machine (manufactured by Rheon Automatic Machinery Co., Ltd.), forming was performed with the extruded mixture obtained in Example 11 as a shell portion and the center cream as a center portion to obtain a water-containing chocolate-like confectionery (cream encrusted product).

Example 16

A pasty mixture obtained by mixing 67.5% by weight of white chocolate base and water-containing raw materials (15% by weight of fructose, 7% by weight of butter, 2.0% by weight of rum, and 8.5% by weight of fresh cream) was fed into an extruder, and cooling transfer, kneading, and extrusion were performed under the following operation conditions. The extruded mixture was cut into a size approximately 2 cm square to obtain a water-containing chocolate-like confectionery. The emulsion type of the obtained water-containing chocolate-like confectionery (mixture) was an oil-in-water type, the water activity was 0.64, and the water content was 7.9%.

Extruder Operation Conditions
  Raw material feed temperature: 20 to 38° C. (pasty mixture, 20° C.: chocolate raw material, 38° C.)
  Internal temperature of cooling region: −5 to 10° C.
  Discharge temperature (surface): 10 to 15° C.

Example 17

In producing the water-containing chocolate of Example 16, almond crush was supplied to the mixture in the zone after cooling and kneading the raw materials by the extruder and before discharging, these were mixed and then discharged, and the obtained composite confectionery was cut into an approximately 2-cm square. The almond crush was added in an amount of 10 parts by weight to 90 parts by weight of the mixture.

Example 18

To 90 parts by weight of the extruded mixture obtained in Example 16, 10 parts by weight of a rum raisin was added and mixed using an overmixer, and then the obtained composite confectionery was formed into a sheet and cut into an approximately 2-cm square.

Example 19

In producing the water-containing chocolate of Example 16, almond crush was supplied to the mixture in the zone after cooling and kneading the raw materials by the extruder and before discharging, these were mixed and then discharged, and the obtained composite confectionery was formed into a sheet having a thickness of 5 mm and further cut into a size of 2.5 cm×2.5 cm. A water-containing chocolate-like confectionery (chocolate sandwich), which was a composite confectionery in which 3.5 g of center cream was placed between the two sheets cut and sandwiched such that the sheets of the mixture were each the outermost layer, was obtained.

Example 20

In producing the water-containing chocolate of Example 16, a rum raisin was supplied to the mixture in the zone after cooling and kneading the raw materials by the extruder and before discharging, these were mixed and then discharged, and the obtained composite confectionery was formed into a sheet having a thickness of 5 mm and further cut into a size of 2.5 cm×5 cm. A water-containing chocolate-like confectionery (biscuit sandwich), which was a composite confectionery in which a biscuit was placed between the two sheets cut and sandwiched such that the sheets of the mixture were each the outermost layer, was obtained.

Example 21

In producing the water-containing chocolate of Example 16, almond crush was supplied to the mixture in the zone after cooling and kneading the raw materials by the extruder and before discharging, and these were mixed and then discharged to obtain a composite confectionery. Using an encrusting machine (manufactured by Rheon Automatic Machinery Co., Ltd.), forming was performed with the composite confectionery as a shell portion and a cheese as a center portion to obtain a water-containing chocolate-like confectionery (cheese encrusted product).

Example 22

A pasty mixture obtained by mixing milk chocolate raw materials (25% by weight of white chocolate, 13% by weight of vegetable fat, and 22% by weight of cacao mass) and the following water-containing raw materials (8.6% by weight of powder sugar, 5.7% by weight of skim milk powder, 15.7% by weight of Meioligo G, and 10% by weight of fresh cream) was fed into an extruder, and cooling transfer, kneading, and extrusion were performed under the following operation conditions. The extruded mixture was cut into a size approximately 2 cm square to obtain a water-containing chocolate-like confectionery. The emulsion type of the obtained water-containing chocolate-like confectionery (mixture) was an oil-in-water type, the water activity was 0.84, and the water content was 10.0%.

Extruder Operation Conditions
  Raw material feed temperature: 20 to 40° C. (pasty mixture, 20° C.; chocolate raw materials, 38° C.)
  Internal temperature of cooling region: 3 to 7° C.
  Discharge temperature (surface): 13 to 15° C.

Example 23

In the production of the water-containing chocolate-like confectionery of Example 22, the rotation speed of the extruder was set to 287 to 431 rpm to obtain a bubble-containing water-containing chocolate-like confectionery having a specific gravity of 0.84 to 0.93.

Example 24

In the production of the water-containing chocolate-like confectionery of Example 22, the rotation speed of the extruder was set to 49 rpm, and further, air was injected from the middle of the barrel at 0.6 MPa to obtain a bubble-containing water-containing chocolate-like confectionery having a specific gravity of 0.88.

Example 25

A center sauce was prepared by mixing 24% by weight of cacao mass, 25% by weight of fructose, 10% by weight of fresh cream, 10% by weight of a sugar liquid, 28% by weight of butter, 2% by weight of an emulsifier, and 1% by weight of rum.

In the production of the water-containing chocolate-like confectionery of Example 22, the rotation speed of the extruder was set to 49 rpm, and further, air was injected from the middle of the barrel at 0.8 MPa to obtain a bubble-containing water-containing chocolate-like confectionery (mixture) having a specific gravity of 0.88. The obtained mixture was discharged by a cylindrical nozzle, and the center sauce was injected from the middle of the nozzle and discharged at the same time. After discharging, it was cut using a wire cutter to obtain a water-containing chocolate-like confectionery (roll type), which was a composite confectionery.

Example 26

A pasty mixture obtained by mixing 52% by weight of white chocolate and water-containing raw materials (19.7% by weight of fructose, 19% by weight of cream cheese, 7% by weight of vegetable fat, and 2.3% by weight of a seasoning material) was fed into an extruder, and cooling transfer, kneading, and extrusion were performed under the following operation conditions. The extruded mixture was cut into a size approximately 2 cm square to obtain a water-containing chocolate-like confectionery. The emulsion type of the obtained water-containing chocolate-like confectionery (mixture) was an oil-in-water type, the water activity was 0.6, and the water content was 11.8%.

Extruder Operation Conditions
   Raw material feed temperature: 20 to 40° C. (pasty mixture, 40° C.: chocolate raw material, 38° C.)
   Internal temperature of cooling region: 3 to 7° C.
   Discharge temperature (surface): 13 to 15° C.

Example 27

The extruded mixture obtained in Example 26 was formed into a sheet having a thickness of 5 mm and cut into a size of 2.5 cm×2.5 cm. A water-containing chocolate-like confectionery (biscuit sandwich), which was a composite confectionery in which a biscuit was placed between the two sheets cut and sandwiched such that the sheets of the mixture were each the outermost layer, was obtained.

In Examples 12 to 27 described above, good formability was exerted at the time of forming the water-containing chocolate-like confectionery because of the good plasticity of the mixture and the like. In addition, the water-containing chocolate-like confectionery exerts good storage stability, for example, even when the mixture is contained in the outermost layer, because of the good storage stability of the mixture.

Although some embodiments and/or Examples of the invention have been described above in detail, those skilled in the art can easily make many modifications to these exemplary embodiments and/or Examples without substantial departure from the novel teachings and effects of the invention. Therefore, these many modifications are included in the scope of the invention.

All the documents described herein and the contents of the application on which the priority under the Paris Convention of the present application is based are incorporated herein.

The invention claimed is:

1. A method for producing a water-containing confectionery, comprising:
   a mixing step of kneading a chocolate raw material and a water-containing raw material with a cooling mixer to obtain an oil-in-water emulsified mixture, the cooling mixer operating such that the chocolate raw material and the water-containing raw material are kneaded at a temperature in a range of –20° C. to 20°° C.,
   wherein the chocolate raw material comprises a cacao-derived component and fat,
   wherein at least one of the chocolate raw material and the water-containing raw material comprises one or more sugars selected from the group consisting of a monosaccharide and a disaccharide,
   wherein the oil-in-water emulsified mixture has a water content of less than 20% by weight, and has a water activity of 0.7 or less,
   wherein the cooling mixer comprises a cooling kneading section for kneading the chocolate raw material and the water-containing raw material under cooling and a discharge port for discharging the mixture,
   wherein the cooling mixer is an extruder having a single screw or multiple screws, and comprises a cooling unit, and
   wherein the water-containing confectionery is produced by the oil-in-water emulsified mixture alone or by combining the oil-in-water emulsified mixture with an auxiliary raw material.

2. The method according to claim 1, wherein the oil-in-water emulsified mixture has plasticity at 20° C.

3. The method according to claim 1, wherein the oil-in-water emulsified mixture has a total content of microcrystalline cellulose and glycerol of 0.5% by weight or less.

4. The method according to claim 1, wherein the oil-in-water emulsified mixture has a content of the one or more sugars of less than 50% by weight.

5. The method according to claim 1, wherein in the mixing step, the chocolate raw material and the water-containing raw material are kneaded in a state where the fat contained in the chocolate raw material is solidified by cooling.

6. The method according to claim 1,
   further comprising combining the oil-in-water emulsified mixture with an auxiliary raw material.

* * * * *